United States Patent
Gomez et al.

(10) Patent No.: US 9,568,103 B2
(45) Date of Patent: Feb. 14, 2017

(54) EXPANDABLE HIGH PRESSURE AND HIGH TEMPERATURE SEAL

(71) Applicant: Baker Hughes Incorporated, Houston, TX (US)

(72) Inventors: Leopoldo S. Gomez, Humble, TX (US); Ganesh K. Nanaware, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 160 days.

(21) Appl. No.: 13/872,587

(22) Filed: Apr. 29, 2013

(65) Prior Publication Data

US 2014/0319783 A1    Oct. 30, 2014

(51) Int. Cl.
| | |
|---|---|
| *F16J 15/06* | (2006.01) |
| *F16J 15/32* | (2016.01) |
| *F16J 15/08* | (2006.01) |
| *F16J 15/10* | (2006.01) |
| *E21B 33/12* | (2006.01) |
| *F16J 15/48* | (2006.01) |
| *E21B 33/10* | (2006.01) |
| *E21B 43/10* | (2006.01) |
| *E21B 33/00* | (2006.01) |

(52) U.S. Cl.
CPC .............. *F16J 15/068* (2013.01); *E21B 33/10* (2013.01); *E21B 33/1216* (2013.01); *E21B 43/103* (2013.01); *F16J 15/3236* (2013.01); *F16J 15/3252* (2013.01); *F16J 15/48* (2013.01); *E21B 33/1208* (2013.01); *E21B 33/1212* (2013.01); *E21B 2033/005* (2013.01)

(58) Field of Classification Search
CPC  E21B 33/1208; E21B 33/1216; E21B 33/128; E21B 2033/005; F16J 15/0881; F16J 15/0887; F16J 15/104; F16J 15/166
USPC ....... 277/607–609; 166/179, 191, 206, 242.1
See application file for complete search history.

(56) References Cited

U.S. PATENT DOCUMENTS

| | | | | |
|---|---|---|---|---|
| 3,885,800 | A | | 5/1975 | Sievenpiper |
| 4,488,740 | A | * | 12/1984 | Baugh et al. .................... 285/84 |
| 4,540,053 | A | * | 9/1985 | Baugh et al. ................. 166/348 |
| 4,597,448 | A | * | 7/1986 | Baugh ........................... 166/348 |
| 4,719,971 | A | * | 1/1988 | Owens .......................... 166/191 |
| 4,757,860 | A | * | 7/1988 | Reimert ........................ 166/208 |

(Continued)

FOREIGN PATENT DOCUMENTS

| | | |
|---|---|---|
| CN | 201407351 | 2/2010 |
| EP | 2273175 A1 | 1/2011 |

*Primary Examiner* — Kristina Fulton
*Assistant Examiner* — Nicholas L Foster
(74) *Attorney, Agent, or Firm* — Steven Rosenblatt

(57) ABSTRACT

An expandable seal features a ring structure with internal and external seal. The seals are mounted in grooves and extend beyond a base outer dimension on the ring on the inside and the outside surfaces. Bumps are positioned in axial alignment with the seals but in opposition to each seal so that the exterior seal has a bump axially aligned but on the inside of the ring and the inner seal has a bump axially aligned and on the outside surface of said ring. The bumps have end transitions to the base dimension to create a volume for the seal material to travel axially when radially expanded from a mandrel extending within for effective seal containment. Seal rings can be stacked to adjust to dimensional irregularities in the surrounding tubular or the mandrel and to back each other up in the event of seal failure in any one seal ring.

14 Claims, 2 Drawing Sheets

(56) References Cited

U.S. PATENT DOCUMENTS

| | | | |
|---|---|---|---|
| 4,911,245 A * | 3/1990 | Adamek et al. | 166/387 |
| 5,098,717 A | 3/1992 | Blackman | |
| 5,129,660 A * | 7/1992 | Taylor et al. | 277/328 |
| 5,333,692 A | 8/1994 | Baugh et al. | |
| 5,355,961 A * | 10/1994 | Gariepy et al. | 166/387 |
| 6,446,717 B1 * | 9/2002 | White et al. | 166/187 |
| 6,666,276 B1 * | 12/2003 | Yokley et al. | 166/387 |
| 7,387,170 B2 * | 6/2008 | Doane et al. | 166/387 |
| 7,784,797 B2 * | 8/2010 | Baugh et al. | 277/607 |
| 8,205,890 B2 * | 6/2012 | Sundararajan | 277/339 |
| 8,235,396 B2 * | 8/2012 | Keene et al. | 277/603 |
| 2005/0180869 A1 | 8/2005 | Ursan et al. | |
| 2005/0189121 A1 * | 9/2005 | Doane et al. | 166/387 |
| 2008/0203672 A1 * | 8/2008 | Smith | 277/356 |
| 2010/0007097 A1 | 1/2010 | Sundararajan | |
| 2010/0206575 A1 * | 8/2010 | Theiss et al. | 166/368 |
| 2013/0140042 A1 * | 6/2013 | Benson et al. | 166/387 |
| 2013/0140775 A1 * | 6/2013 | Raynal et al. | 277/328 |

* cited by examiner

EXPANDABLE HIGH PRESSURE AND HIGH TEMPERATURE SEAL

FIELD OF THE INVENTION

The field of the invention is expandable high pressure and high temperature seals and more specifically design features to enhance pressure retaining capabilities.

BACKGROUND OF THE INVENTION

High pressure metal to metal seals have been used as shown in U.S. Pat. No. 6,098,717. These seals are actuated by internal expansion and can be fitted with one or more seals. Another example is U.S. Pat. No. 5,333,692. In this patent the seal ring is expanded with a tapered swage and the outer surface of the ring has extending members initially covered with a seal. Radial expansion brings the fingers through the seal material for metal to metal contact with the surrounding tubular as the seal element is contained between the extending members. These designs have been reliable and have been in regular use for at least 10 years or more.

More recently the service pressure differentials have gotten larger as the wells have been drilled to greater depths. As a result the seal bodies exhibited limitations on seal containment due to the stresses they could tolerate with the needed amount of radial expansion and pressure differentials. Efforts were focused at seal configurations that would improve seal containment by reducing stress on the seal body at the anticipated differential pressures and the amount of radial expansion.

The present invention has focused on features of the seal body that improves seal containment with reducing the stresses by providing an exterior bump between exterior seal elements that is opposed to an interior seal and internal bumps opposed to spaced external seals. The bumps feature end transitional surfaces that provide an extrusion volume for the seal which allows effective seal containment at the anticipated differential pressures and the amount of radial expansion. The seal configuration can be reversed with one exterior seal and two axially offset interior seals. Another feature of the invention is stacks of seal rings can be deployed between end rings preferably made of high performance thermoplastics or metal so that not only can each seal ring back up other rings but the stack of seal rings can expand independently to deal with dimensional irregularities in the surrounding tubular or the mandrel being expanded, hence creates effective sealing. These and other aspects of the present invention will be more apparent to those skilled in the art from a review of the description of the preferred embodiment and associated drawings while recognizing that the full scope of the invention is to be determined from the appended claims.

SUMMARY OF THE INVENTION

An expandable seal features a ring structure with internal and external seal. The seals are mounted in grooves and extend beyond a base outer dimension on the ring on the inside and the outside surfaces. Bumps are positioned in axial alignment with the seals but in opposition to each seal so that the exterior seal has a bump axially aligned but on the inside of the ring and the inner seal has a bump axially aligned and on the outside surface of said ring. The bumps have end transitions to the base dimension to create a volume for the seal material to travel axially when radially expanded from a mandrel extending within. Seal rings can be stacked to adjust to dimensional irregularities in the surrounding tubular or the mandrel and to back each other up in the event of seal failure in any one seal ring.

DETAILED DESCRIPTION OF THE PREFERRED EMBODIMENT

Figure 1:
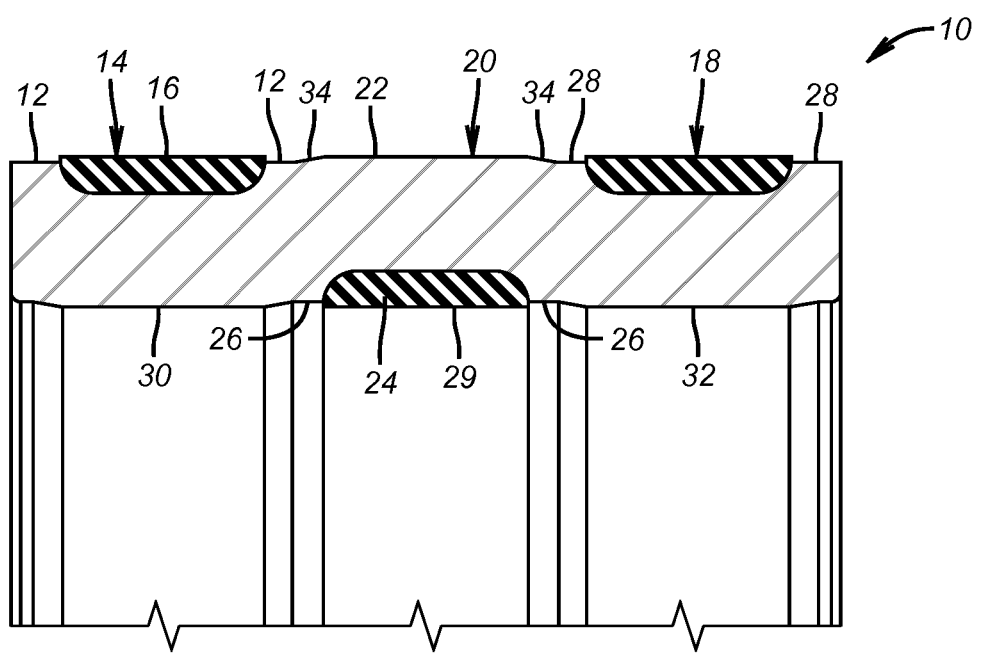
FIG. 1 shows an embodiment of the expandable seal ring with two exterior seals and one interior seal.

FIG. 1 illustrates an expandable seal assembly 10 that is a tube shape having an exterior base dimension 12 measured next to a seal 14 that has an outer sealing surface 16 that extends radially beyond base dimension 12. In between seals 14 and 18 is a bump 20 that has an outer surface 22 that is preferably axially aligned with the inside seal 24. Adjacent seal 24 has inside base dimension 26 with the sealing surface 29 on seal 24 extending radially inwardly beyond base dimension 26 that is disposed on opposed sides of seal 24. Similarly the base dimension 12 is on opposed sides of seal 14. The same holds true for seal 18, having base surfaces 28 on opposed sides. Preferably the outside diameter at base surfaces 12 and 28 is the same.

Bumps 30 and 32 are preferably disposed opposite seals 14 and 18 is the sense of axial alignment. It is preferred that the axial length of the bumps in each case approximates the axial length of the seal that is directly opposed in a radial direction. Referring to bump 20 as a typical example, the axial ends of that bump have tapered end surfaces 34 that transition to surfaces 12 and 28. The taper angle is preferably gradual at about 3-45 degrees. When the bump 20 contacts a surrounding tubular there is a volume formed adjacent seal 14 for example that allows some of the seal material to move axially into that adjacent void opposite base surface 12. The same is true on the other side adjacent seal 18 where seal material can move axially over base surface 28. Although not shown in FIG. 1, end rings such as 36 and 38 preferably made of PEEK or high performance thermoplastics or metal and shown in FIG. 3 can be used in FIG. 1 to about base surfaces 12 and 28 at opposed ends of the seal assembly 10 so that seal material that is part of seals 14 and 18 can move axially into adjacent void spaces in opposed directions. The same holds true for seal 24 on the inside of seal assembly 10.

Figure 2:
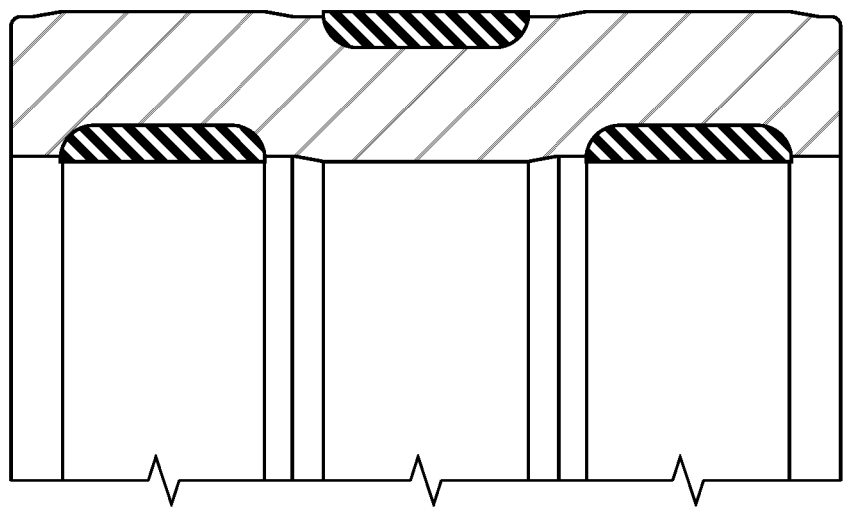
FIG. 2 is the reverse of FIG. 1 with two internal seals and one external seal.
Figure 3:
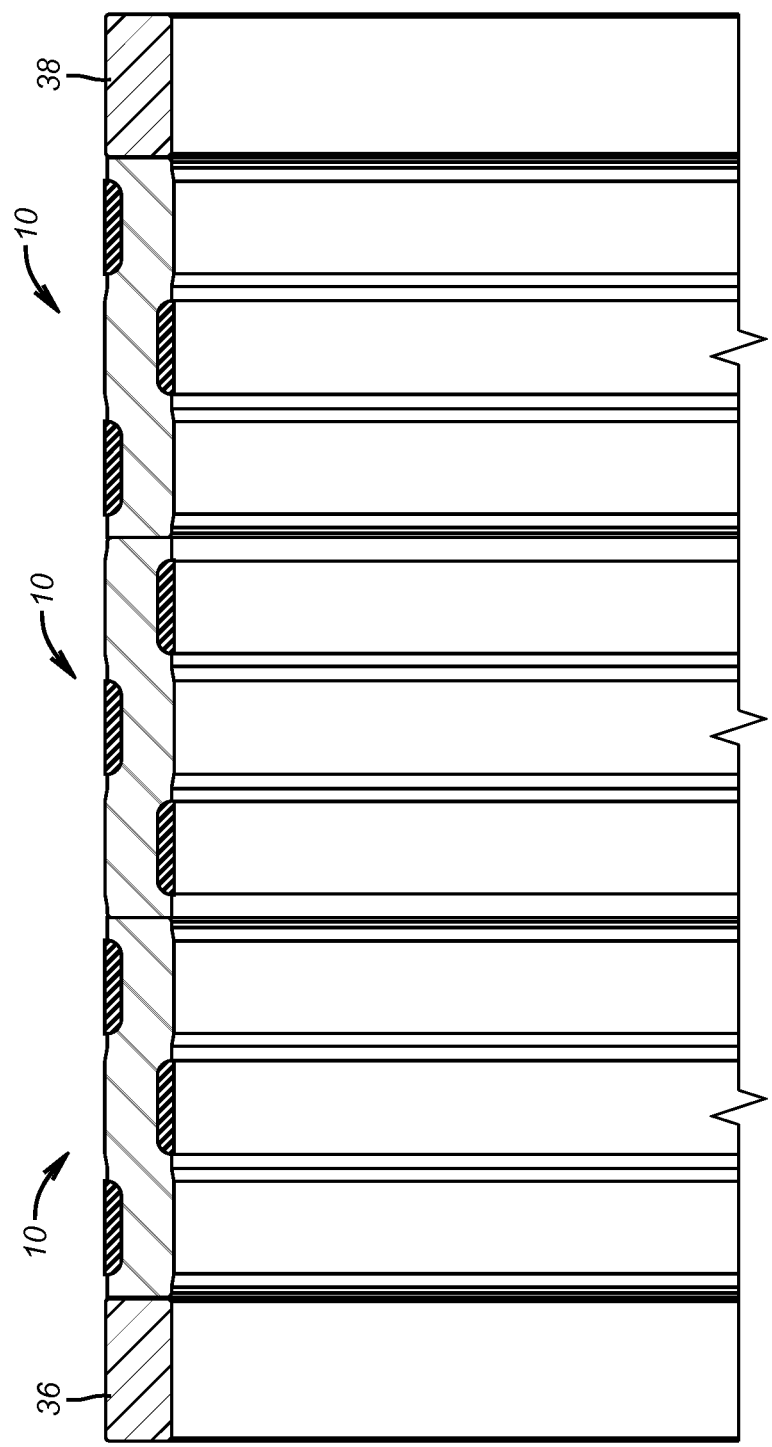
FIG. 3 shows a stack of seal rings as shown in FIG. 1 and flanked by backup end rings.

Those skilled in the art will appreciate that FIG. 2 is the inverse of FIG. 1 and the above described dimensional relationships for FIG. 1 still hold for FIG. 2. FIG. 3 shows three stacked seal assemblies of the type shown in FIG. 1 although those skilled in the art will understand that fewer or greater numbers of seal assemblies can be used and the orientations need not be the same for each component assembly 10. Furthermore each unit can have one or more than one seal in the interior and/or the exterior despite the fact that the illustrated embodiment is for two seals on one side and one on the opposite side.

While all the assemblies 10 and the end rings 36 and 38 are assembled on a common mandrel that is not shown and expanded as a swage moves continuously through that mandrel the stacking of seal assemblies 10 provides several advantages. One advantage is that the assemblies 10 can move independently of each other so that if the surrounding tubular is out of round or has non-uniform wall thickness the independent movement can conform to such unevenness in the surrounding tubular or for that matter in the mandrel or even in the swage that moves through the mandrel. Another advantage is that the seals can back each other up on discrete assemblies 10 so that in the event of a seal failure on seals on one assembly 10 the seals on the next assembly 10 can take over.

Those skilled in the art will appreciate that the positioning of the bumps opposite the seal assemblies provides a nearly consistent wall thickness throughout the assembly 10. Where the wall is removed for a groove for a seal there is an offsetting bump on the opposite side of the wall. The structure of assembly is strengthened in the seal area and the stress is reduced making it possible to withstand greater pressure differentials, thus creates effective sealing through seal volume containment. The ability of some of the seal material to flow axially while being contained against the mandrel on the inside or the surrounding pipe on the outside allows for lower stress in the seal and a greater seal coverage area at the same time. Using an array of seal assemblies allows them to move independently to accommodate dimensional irregularities in the surrounding tubular or the mandrel inside the assembly. The seals extend radially adjacent base diameters on either side so that upon contact with a surrounding tubular for example the seal is compressed and some of that compressive stress is relieved in the adjacent void space in part defined by a bump that may be on one or opposed ends or the end ring as the case may be.

The above description is illustrative of the preferred embodiment and many modifications may be made by those skilled in the art without departing from the invention whose scope is to be determined from the literal and equivalent scope of the claims below:

We claim:

1. An expandable seal assembly for use between a radially expanded mandrel and a surrounding tubular, comprising:
   at least one substantially cylindrical tubular body having a longitudinal axis and having a cylindrical inside base surface and a cylindrical outside base surface;
   at least one first seal disposed in and filling at least one first groove in said inside base surface and at all times extending beyond said inside base surface and at least one second seal disposed in and filling at least one second groove in said outside base surface and at all times extending beyond said outside base surface, said first and second grooves have opposed groove ends adjacent opposed ends of said first and second seals contained therein;
   at least one first bump on said tubular body discrete from said first and second seals extending axially on at least one of said inside and outside base surfaces for the substantial length of an opposing at least one of said seals and in substantial axial alignment therewith, said first hump capable of making contact with said mandrel or said surrounding tubular when said tubular body is expanded to create an axially adjacent space from an adjacent base surface for contained axial movement of an adjacent said seal;
   said tubular body providing a substantially consistent wall thickness measured perpendicularly to said axis as between axially spaced locations where said bump and said groove are opposed and any location where there is no bump or opposed groove present.

2. The expandable seal assembly of claim 1, wherein: said first bump has a tapered end transition to said adjacent base surface.

3. The expandable seal assembly of claim 2, wherein: said transition forms an angle of 3-45 degrees with respect to said adjacent base surface.

4. The expandable seal assembly of claim 1, wherein: at least one of said seals extends out of said groove in which said seal is disposed-and beyond said adjacent base surface before expansion of said tubular body.

5. The expandable seal assembly of claim 1, wherein: at least one of said seals moves axially in at least one direction when subjected to compressive force on a radial expansion of said tubular body.

6. The expandable seal assembly of claim 1, further comprising:
   at least one end ring on at least one end of said tubular body.

7. The expandable seal assembly of claim 6, wherein: said at least one end ring is made of PEEK or high performance thermoplastics or metal.

8. The expandable seal assembly of claim 1, wherein: said tubular body comprises a second bump located on an opposite side of said tubular body from one of said seals and in substantial axial alignment therewith.

9. The expandable seal assembly of claim 8, wherein: one of said inside base surface or said outside base surface has a third seal.

10. The expandable seal assembly of claim 8, wherein: a third bump is on the same side of said tubular body as said first or second bump and radially extends the same distance from an adjacent base surface.

11. The expandable seal assembly of claim 8, wherein: said tubular body has a wall thickness at one of said bumps approximating a wall thickness in an axially spaced transverse section of said tubular body where the first or second groove is not located.

12. The expandable seal assembly of claim 8, wherein: said assembly comprises at least one additional tubular body stacked with the at least one tubular body between a pair of end rings.

13. The expandable seal assembly of claim 12, wherein: said tubular bodies move independently on expansion to conform to a mandrel within or a surrounding tubular.

14. The expandable seal assembly of claim 13, wherein: at least one of said seals on one of said tubular bodies backs up at least one other seal on a different one of said tubular bodies.

* * * * *